March 17, 1925.

P. J. MOLONEY 1,530,192

MANUAL CHORD PLAYER FOR PLAYING PIANOFORTES AND ORGANS

Filed March 10, 1924

Inventor
Patrick Joseph Moloney.

Attorney

Patented Mar. 17, 1925.

1,530,192

UNITED STATES PATENT OFFICE.

PATRICK JOSEPH MOLONEY, OF KENSINGTON, NEAR SYDNEY, NEW SOUTH WALES, AUSTRALIA.

MANUAL CHORD PLAYER FOR PLAYING PIANOFORTES AND ORGANS.

Application filed March 10, 1924. Serial No. 698,274.

*To all whom it may concern:*

Be it known that I, PATRICK JOSEPH MOLONEY, subject of the King of Great Britain and Ireland, residing at Sacred Heart Monastery, Kensington, near Sydney, New South Wales, Australia, but temporarily of Adelaide, South Australia, Australia, have invented new and useful Improvements in Manual Chord Players for Playing Pianofortes and Organs, of which the following is a specification.

This invention consists in an instrument for enabling persons who are not practised musicians to select semi-automatically certain chords and to play the same on pianofortes or organs to produce harmonized accompaniments.

The instrument which is hereinafter described is usable after a little practice by any person who is sufficiently qualified to accompanying a melody by striking only the melody notes. If it be manipulated to follow the melody notes it will enable the user to strike automatically certain simple chords, and certain inversions of those chords, and obtain a tolerable measure of harmony for accompaniment purposes.

The instrument may be made to cover either a single octave or a range of two or three octaves, and may be constructed with certain movable elements which will be usable by persons having some knowledge of music for the purpose of introducing notes other than the notes which are selected and played by fixed elements in the instrument.

Unless the instrument be used with considerable expertness and notes be selected and struck by the fingers of the player in addition to the notes which are selected and struck by means of the instrument, the instrument is usable only in the key of C to produce chords in that key and inversions of them, including the dominant and subdominant chords of C; and the chords of D minor and E minor; and the chord of F.

In its simplest form the instrument consists in a rigid bar adapted to be held near its ends in the hands of the player, and having set upon certain of its sides cushioned fingers in spaced order. In the preferred form of the instrument which is designed for the use of persons with minimum knowledge of music, the fingers are fixed. In the case of the adaptable form of the instrument, some or all of the fingers are arranged to slide freely through holes in the bar as plungers so that they will be operative only when held down by the fingers of the player, but will otherwise remain free. The player uses his knowledge and judgment to select such of these movable plunger fingers as are necessary to make chords or to complete chords which are incompletely formed by means of fixed fingers.

The user is called upon only to set the appropriate "index" finger (which may be differentiated in shape, color, or otherwise, from the other buttons) in proper relation to the key note, and to strike the instrument on the keys so as to sound all the notes covered by its fingers, or by those fingers and the fingers of the player either simultaneously or nearly so to produce the corresponding chord, and either with uniform impulse or with greater or less accent as desired on the bass end or on the treble end of the rod as the case may be. The highest note struck is in all cases the melody note.

These instruments serve the purposes for which vamping charts and similar sight reading indicators are sometimes used, but in unpractised musicians' hands they eliminate the greater part of the concentrated attention of the player which is demanded in the use of such charts inasmuch as they impose on the player only the duty of locating the melody notes and acquiring a moderate measure of dexterity in manipulation and an elementary sense of the tone value of the chords, which is not difficult if the player is possessed of reasonable aptitude and is reasonably sensitive to harmony.

In the accompanying drawings—

Figure 4:
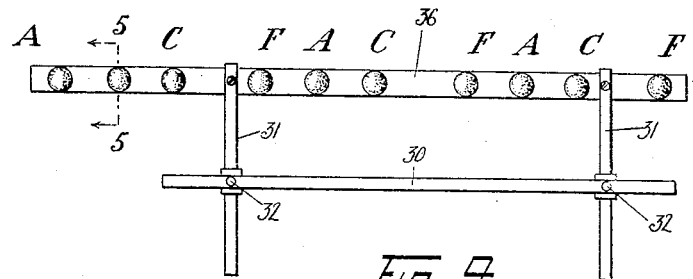
Fig. 4 is a top plan view of the instrument of the form in which it is fitted with plunger fingers and adapted to be set individually by the operation of the player's fingers.
Figure 6:
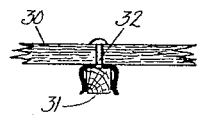
Figure 7:
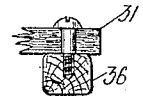

5—5 Fig. 4 through the bar showing the structural form of one of the plunger fingers;

Fig. 6 is a transverse fragmentary section showing the attachment means for securing the riding bar on bracket rods which serve as holding means for the finger bar (Fig. 4); and Fig. 7 is a fragmentary sectional view showing the attachment of the bracket bars to the finger bar (Fig. 4).

Figure 1:
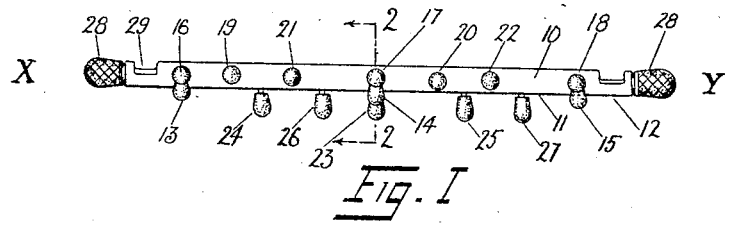
Fig. 1 is an elevational view of the instrument having a range of two octaves.

In the instrument shown in Fig. 1 three ranges of fixed fingers are fitted, one range on the side 10 of the bar, another range on the contiguous (under) side 11 of the bar, and a third range on the intermediate corner 12 of the bar. The fingers on the bar corner 12 are numbered respectively 13, 14, and 15. These fingers are spaced in octave relation. On the front side 10 of the bar corresponding fingers, also in octave relation, 16, 17 and 18 are fixed. On the treble and bass sides of the middle or "key" position where the fingers 14 and 17 are located, the fingers which are fixed on the front side 10 and the underside 11 of the bar occupy the same relative positions in relation to the octave positions.

The finger 17 being located over the keynote C, the fingers 16 and 18 will be located on the lower and upper octave C while the intermediate fingers 19 and 20 will be located on E natural and the fingers 21 and 22 on G natural.

On the underside of the bar the middle finger 23 being located over C natural, the fingers 24 and 25 will be located over F natural and the fingers 26 and 27 over A natural. 28 are milled ends to facilitate the holding of the bar by the player, and 29 are locating notches by which the player is enabled to handle the instrument with better facility and to assure himself of the desired setting of it to bring either the lower row of fingers or the lateral row of fingers into operative contact with the keys of the piano or organ.

Figure 3:
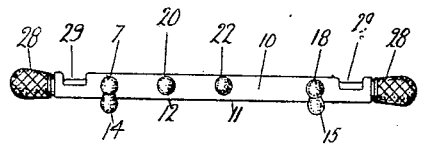
Fig. 3 is a side elevational view of a modified form of the instrument as constructed for striking simple chords only.

Referring to Fig. 3, the construction is identical, except that a range of one octave only is provided, the fingers corresponding with the fingers in one of the octave ranges of the instrument Fig. 1 and being indicated by the same reference numbers.

In the Fig. 3 instrument a range of fingers is not fitted on the underside 11 of the bar.

Figure 2:
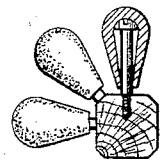
Fig. 2 is a cross section on the line 2—2 Fig. 1.

The fingers consist preferably of rubber pads mounted on screws fixed in the bar in the manner indicated in the sectional view in Fig. 2. If, however, the whole structure be moulded, the fingers may be otherwise constructed and may be formed integral with the bar, or may be attached to it by means otherwise than screws as shown in Fig. 2.

For the purpose of facilitating description, one end of the instrument (Fig. 1) is indicated as X and the other end of it as Y, its face 10 being referred to as the lateral face and its face 11 as the underside face.

With the bar in normal position with its end Y towards the treble end of the keyboard, with its lateral face 10 downward so that the fingers 16, 19, 21, 17, 20, 22, and 18 strike the keys, the chords obtained will be the following:—

With the index finger 23 on C, major—C.
With the index finger 23 on D, minor—D.
With the index finger 23 on E, minor—E.
With the index finger 23 on F, major—F.
With the index finger 23 on G, major—G.
With the index finger 23 on A, minor—A.
With the index finger 23 on B, diminished triad—B.

If the instrument be now turned through an angle of 90° so as to bring the underside face 11 downwards and thereby enable the fingers 24, 26, 23, 25, and 27 to contact with the keys, the chords obtained for each successive position of the index finger 23 on the natural keys C to B will be the following:—

C, chord of the sub-dominant of C.
D, chord of the dominant of C.
E, common chord of A minor.
F, diminished triad.
G, major common chord of C.
A, common chord of D minor.
B, common chord of E minor.

Assuming now that the instrument be reversed end for end so that the end X is in the treble position and the end Y in the bass position, then the instrument is placed over the keyboard with the bottom face 11 downward so that the finger 23 will be located over C natural and the bar will be struck downwards so as to cause the fingers 24, 26, 23, 25 and 27 to contact with the keys and the chord produced will be the second inversion of the common chord of C major. If the finger 23 be located on D natural the chord produced will be the first inversion of the common chord of D minor; if it be placed on E natural the chord produced will be the first inversion of the common chord of E minor; if it be placed on F natural the chord produced will be the first inversion of the common chord of F major. If the finger 23 be placed on G the chord produced will be the first inversion of the common chord of G major; if it be placed on A the chord produced will be the first inversion of the common chord of A minor; and if it be placed on B natural the chord produced will be the second inversion of the dominant-seventh of C with its root G omitted.

If, how, the bar be turned through an angle of 90° so as to bring the lateral face 10 downward and the keys be struck in the same successive order, that is to say, commencing on C natural and passing through to naturals D, E, F, G, A, and B, the chords successively produced will be the following:—

C, second inversion of the common chord of F major.

D, second inversion of the common chord of G major.

E, second inversion of the common chord of A minor.

F, third inversion of the chord of the dominant-7th of C omitting its root G.

G, second inversion of the common chord of C major.

A, second inversion of the common chord of D minor.

B, second inversion of the common chord of E minor.

If now the instrument be rolled from the last position so as to set it angularly and thereby enable the fingers 13 and 15 to contact with the keys simultaneously with the fingers 24, 26, 23, 25 and 27, the following chords will be produced respectively at each shift of the instrument along the keyboard from the keynote C to the keynote B successively:—

With the index finger 23 located on C the upper and lower octaves C will be added to the chord and the chord obtained will be the common chord in root position of C; on D the common chord of D minor in root position; on E the common chord of E minor in root position; on F the common chord of F major in root position; on G the common chord of G major in root position; on A the common chord of A minor in root position. The first inversion of the dominant-7th of C with its root G is omitted.

Figure 5:
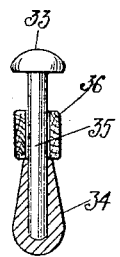
Fig. 5 is a transverse section on the line

In the movable finger type of the instrument shown in Figs. 4 to 7, a movable finger constructed as shown in Fig. 5 may be fitted to set over each one of the keys on the keyboard, or, optionally, only over certain of those keys. None of these fingers will strike a note unless held down by the finger of the player. The holding bar 30 which is adjustably attached to the bracket rods 31 by the pivoted sliders 32 (see Fig. 6) is adjusted by the player in easy position for the holding of the instrument so that the player's fingers may make contact with the finger studs 33 of the plungers 34, the stems 35 of which are freely slidable through holes in the bar 36. The player is thus enabled when grasping the instrument to hold the fingers in any desired order so as to procure, for instance, any of the combinations shown in either of the five arrangements practicable with the fixed type of the instrument which has been already described with reference to Fig. 1, and then to operate the instrument in the same way as has been described with reference to Fig. 1 and so produce the desired chords. An elementary knowledge of the chords will, however, be necessary to enable the player in this case to select the desired fingers to be held down, but a greater facility is offered the player if he has sufficient knowledge to manipulate the instrument as he is enabled to procure chords other than those procurable with the fixed finger type of instrument. With additional expertness the player is enabled to strike the flats and sharps or some of them with his fingers in order to complete the desired chords.

What I claim as my invention and desire to secure by Letters Patent is—

1. A chord finding and playing instrument for keyboard musical instruments, consisting of a single bar having means for holding and rotating in the hands of the player with fingers fixed permanently on said bar projecting from adjacent sides of said bar for contacting with the keys of the instrument and spacially related in positions along the respective sides of the bar relatively to the location of the natural keys located at predetermined intervals whereby upon the rotation of said bar different chords may be played.

2. In an instrument according to claim 1, additional fingers located at octave intervals in an angular position on the bar to enable the addition of upper and lower octaves in chords which are found by fingers on the adjacent sides of the bar.

3. An instrument for finding and playing chords on keyboard musical instruments, consisting of a bar having plunger fingers mounted therein in spaced relation relatively to the natural keyboard, said bar adapted to be held by the player, and said plunger fingers adapted to be depressed by the fingers of the player to render the same operative when the bar is struck down towards the keys.

4. An instrument for finding chords and playing the same on keyboard musical instruments, comprising a bar having on adjacent sides of it contact fingers adapted for striking the keys, said fingers being arranged in one order of spaced relationship on one side of the bar and in another order of spaced relationship on the adjacent side of the bar, with additional fingers in octave relation to the index finger position on the angle of the bar, thereby to enable the octaves to be superadded to the notes found by the fingers on the adjacent sides of the bar.

5. An instrument according to claim 1, having finger notches formed in one side of the bar, said notches disposed to offer an indication to the player to prompt him in effecting positioning of the bar over the keyboard.

In testimony whereof I have signed my name to this specification.

PATRICK JOSEPH MOLONEY.